Dec. 15, 1964   DUNCAN TONG   3,161,559

STEM MOUNTING FOR ARTIFICIAL FLOWERS

Filed July 25, 1961

INVENTOR
DUNCAN TONG
BY
ATTORNEY

United States Patent Office 3,161,559
Patented Dec. 15, 1964

---

3,161,559
STEM MOUNTING FOR ARTIFICIAL FLOWERS
Duncan Tong, Central Bldg., 3 Pedder St.,
Victoria, Hong Kong
Filed July 25, 1961, Ser. No. 126,686
4 Claims. (Cl. 161—30)

This invention relates to the assembly of components of artificial flowers and more particularly to the mounting and interconnection of the stem of an artificial flower with the corolla, petals and analogous members.

It is the object of the present invention to provide a rugged and reliable stem structure which is designed to have mounted thereon cooperating floral components, for example, the corolla, so that the interconnection between the top of the stem and the corolla may be executed quickly, and which results in a connection between the parts which is durable.

It is a further object of the invention to provide for the secure mounting of the corolla to the top of the stem by means of additional floral components, such as the calyx, disposed below the corolla and cooperating in a special manner with the external wall of the stem.

Other objects and purposes will appear from the detailed description of the invention following hereinafter, taken in conjunction with the accompanying drawing, wherein FIG. 1 is a plan view of an artificial flower embodying the instant invention;

Figure 3:
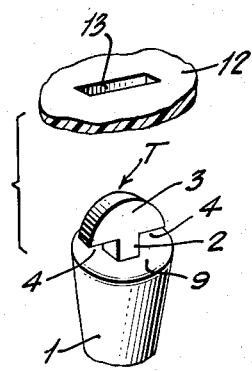
FIG. 3 is an exploded view of the central portion of the corolla and the top of the stem showing the mode of interconnecting these two components.
Figure 1:
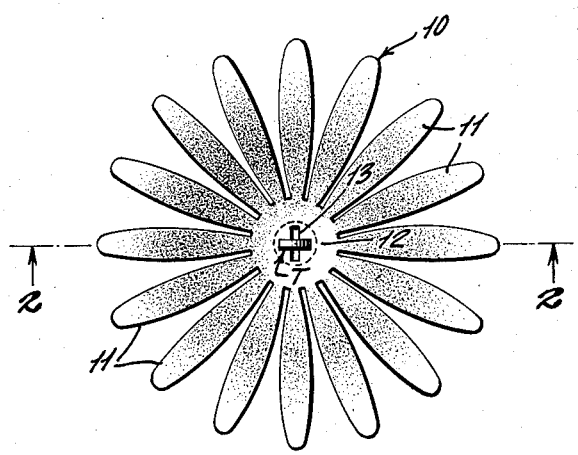

In the drawings is shown a stem 1 which may be molded or extruded of flexible plastic material, of any desired color, for example, green, to simulate the stem of a natural flower. The corolla or petal unit 10 is likewise molded from synthetic resin or other plastic material with a plurality of petals 11 to simulate any suitable flower design. The flexible central portion 12 of the corolla is provided with a slot 13 which, in FIG. 1, is shown as being of rectangular outline.

The top of the stem 1 terminates in a plateau 9 from which extends the flattened terminal connecting member T having a generally T-shaped configuration composed of a shank 2 and head 3 having a convexly curved top, leaving spaces 4 between the top of the plateau 9 and the bottom surfaces of the head member 3. While the cross-section of the slot 13 conforms substantially to the cross-section of the flattened head member 3, the same is slightly less in cross-section area, so that a slight stretching or flexing of the central portion 12 is required to permit the passage of the rounded head 3 therethrough. Thereafter, the stem is given a rotary movement of about 90° to place the head member 3 transversely across the slot 13, as shown in FIG. 1, to interconnect the two parts together. The shank 2 of the terminal member spans the short dimension of the slot 13 with the rest of the central portion of the corolla disposed between the plateau 9 and the bottom surfaces of the head 3. Several corolla or petal units may be mounted on the top of the stem if such floral effects are desired.

In order to secure the corolla more positively at the tip of the stem, a calyx 17, suitably colored, preferably green, and molded of synthetic plastic material, is threaded through its central opening 18 onto the stem below the lowermost corolla 10. Barbs or thorns 15 are integrally molded on the external wall of the stem and are preferably pointed in an upward direction in order to permit the calyx to be slid upwardly on the stem and to be retained tightly in its position by the thorns 15 which prevent any easy retrograde movement thereof. The calyx 17 supports the corolla beyond the central portion thereof towards the stem and complements the interconnection between the parts at the top of the stem.

Figure 4:
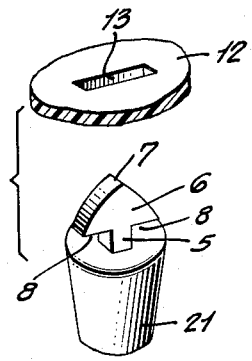
FIG. 4 is a view similar to FIG. 3 illustrating a different embodiment of retainer at the top of the stem.
Figure 2:
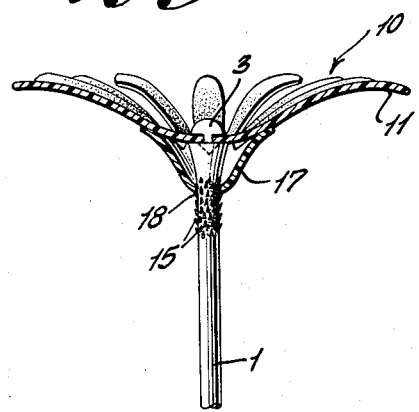
FIG. 2 is a vertical sectional view along line 2—2 of FIG. 1.

The objectives of the invention may be attained with variations of the flattened terminal member. One of such variations is illustrated in FIG. 4 wherein the terminal member on the top of the stem 21 is formed of a head 6 and a shank 5, leaving spaces 8 between the bottom of the head and the top of the stem. The top of the head is formed of two convexly curved portions which terminate in a point 7, which facilitates the penetration of the terminal member through the slot 13 in the flexible central portion 12 of the corolla.

Figure 5:
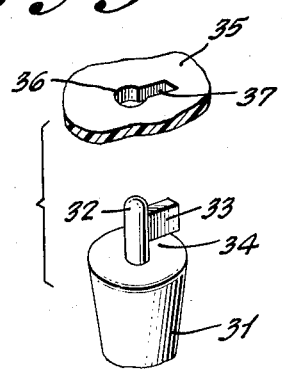
FIG. 5 is a view similar to FIG. 3 showing still a different embodiment of interconnecting means between the central portion of the corolla and the flower stem.

FIG. 5 illustrates still another mode of interengagement of the top of the stem 31 with the central portion 35 of a corolla. In this embodiment, the terminal member resembles a key having a vertical cylindrical shank 32 and a flattened wing 33 extending from the midportion thereof, leaving a space 34 between the bottom face of the wing 33 and the top of the stem. The slot in the central portion 35 of the corolla is formed of a keyhole configuration corresponding to the cross-section of the terminal member and comprises a circular opening 36 from which extends a rectangular slot 37. The corolla is mounted upon the stem by interengaging elements 32 and 33 at the top of the stem with elements 36 and 37 of the corolla, respectively, and thereafter turning the stem so that the parts are maintained in interconnected relation.

As in the first embodiment described above, the male terminal members in the embodiments of FIGS. 4 and 5 are of slightly larger cross-section than the respective slots in the corolla, in order to obtain a tight interconnection between the parts for the purpose of preventing any unintentional separation therebetween.

While I have described my invention as embodied in specific forms and as operating in specific manners for purposes of illustration, it should be understood that I do not limit my invention thereto, since various modifications will suggest themselves to those skilled in the art without departing from the spirit of my invention, the scope of which is set forth in the annexed claims.

I claim:
1. An artificial flower comprising a flexible petal unit of molded plastic material and a stem of molded plastic material having an end thereof detachably engaged with said petal unit, said petal unit having a slot with a rectangular opening forming at least part thereof disposed at the central portion of said petal unit, a terminal member at said end of said stem comprising a thin shank and an enlarged head having a cross-section similar to but slightly larger than that of said slot to require a slight stretching of the central portion of the petal unit to effect the passage of the head through said slot, said petal unit adapted to be interlocked with said stem by a relative rotation of said stem and petal unit which is permitted by said thin shank within said slot while the edge of said enlarged head adjacent to said shank overlies the surface of said petal unit adjacent to said slot to interconnect the stem therewith.

2. An artificial flower as set forth in claim 1 wherein the top of the enlarged head of the terminal member is curved convexly.

3. An artificial flower as set forth in claim 1 wherein the top of the enlarged head of the terminal member is curved convexly and is pointed at its mid-portion.

4. An artificial flower as set forth in claim 1 wherein the slot in the petal unit is of keyhole configuration having a cylindrical aperture merging into the rectangular opening, and the enlarged head of said terminal member is similar to a key with a thin shank of cylindrical cross-section and a flattened wing extending radially therefrom.

References Cited by the Examiner
UNITED STATES PATENTS

| | | | |
|---|---|---|---|
| 2,054,605 | 9/36 | Rogers | 41—13 |
| 2,984,036 | 5/61 | Adler | 41—14 |

FOREIGN PATENTS

| | | |
|---|---|---|
| 1,219,368 | 12/59 | France. |
| 561,061 | 4/57 | Italy. |

EARL M. BERGERT, *Primary Examiner.*

JACOB H. STEINBERG, ALEXANDER WYMAN,
*Examiners.*